US009210591B2

(12) United States Patent
Cattan (10) Patent No.: US 9,210,591 B2
(45) Date of Patent: Dec. 8, 2015

(54) SYSTEM AND METHOD FOR STEERING OF ROAMING

(71) Applicant: StarHome GmbH, Zurich (CH)

(72) Inventor: Ariel Cattan, RaAnana (IL)

(73) Assignee: StarHome GmbH, Zurich (CH)

( * ) Notice: Subject to any disclaimer, the term of this patent is extended or adjusted under 35 U.S.C. 154(b) by 184 days.

(21) Appl. No.: 13/780,027

(22) Filed: Feb. 28, 2013

(65) Prior Publication Data

US 2013/0237184 A1  Sep. 12, 2013

Related U.S. Application Data

(60) Provisional application No. 61/609,464, filed on Mar. 12, 2012.

(51) Int. Cl.
*H04W 24/02* (2009.01)
*H04W 8/08* (2009.01)
*H04W 8/06* (2009.01)

(52) U.S. Cl.
CPC .............. *H04W 24/02* (2013.01); *H04W 8/08* (2013.01); *H04W 8/06* (2013.01)

(58) Field of Classification Search
CPC ..... H04M 15/49; H04M 15/50; H04M 15/54; H04M 15/58; H04M 15/8011; H04M 15/8044; H04M 2215/0184; H04M 2215/0188; H04M 2215/46; H04M 2215/52; H04M 2215/74; H04M 2215/7407; H04M 2215/745; H04W 8/04; H04W 8/06; H04W 8/12
USPC ......... 455/432.1, 433, 450; 709/226; 718/104
See application file for complete search history.

(56) References Cited

U.S. PATENT DOCUMENTS

| 5,564,068 A | 10/1996 | Nguyen |
| 5,734,980 A | 3/1998 | Hooper et al. |
| 5,950,130 A | 9/1999 | Coursey |
| 5,999,811 A | 12/1999 | Mölne |

(Continued)

FOREIGN PATENT DOCUMENTS

| EP | 0719064 | 6/1996 |
| EP | 0889661 | 1/1999 |

(Continued)

OTHER PUBLICATIONS

European Commission Brussels 29.6.2010 Com(2010)356 final.*

(Continued)

*Primary Examiner* — Vladimir Magloire
*Assistant Examiner* — Ernest Tacsik (57) ABSTRACT

Apparatus for steering of roaming users to preferred operators at a roaming network uses operator agreements with mobile operators, as well as usage predictions and historical usage patterns, to calculate an optimized steering plan that minimizes the charges to the home operator. The operator agreements are typically step-like in nature and the plan is constructed by iterating through different allocations of the estimated usage between the various mobile operators. The iterations may include various roaming services such as SMS and data as well as mobile originated and mobile terminated calls. The allocation finally selected as the optimal plan is then output to a steering of roaming unit which identifies registration attempts by actual roaming users and steers said registration attempts to fulfill the quotas in the plan.

19 Claims, 5 Drawing Sheets

(56) References Cited

U.S. PATENT DOCUMENTS

| | | | |
|---|---|---|---|
| 6,032,055 A | 2/2000 | Yazaki et al. | |
| 6,122,503 A | 9/2000 | Daly | |
| 6,122,510 A | 9/2000 | Granberg | |
| 6,148,197 A | 11/2000 | Bridges et al. | |
| 6,154,662 A | 11/2000 | Norton et al. | |
| 6,223,028 B1 | 4/2001 | Chang et al. | |
| 6,345,184 B1 | 2/2002 | Von der Salm et al. | |
| 6,411,697 B1 | 6/2002 | Creamer et al. | |
| 6,411,807 B1 | 6/2002 | Amin et al. | |
| 6,490,449 B1 | 12/2002 | Thibert et al. | |
| 6,560,455 B2 | 5/2003 | Amin et al. | |
| 6,564,055 B1 | 5/2003 | Hroneck | |
| 6,625,451 B1 | 9/2003 | La Medica, Jr. et al. | |
| 6,735,434 B2 | 5/2004 | Criss et al. | |
| 6,778,829 B1 | 8/2004 | McDonald et al. | |
| 6,965,781 B1 | 11/2005 | Lewis | |
| 6,978,157 B1 | 12/2005 | Amiens | |
| 7,072,651 B2 | 7/2006 | Jiang et al. | |
| 7,089,001 B2 | 8/2006 | Leung et al. | |
| 7,113,764 B1 | 9/2006 | Jang et al. | |
| 7,139,570 B2 | 11/2006 | Elkarat et al. | |
| 7,191,234 B2 | 3/2007 | Farrugia et al. | |
| 7,212,621 B1 | 5/2007 | Wallenius et al. | |
| 2001/0028654 A1 | 10/2001 | Anjum et al. | |
| 2001/0034704 A1* | 10/2001 | Farhat et al. | 705/39 |
| 2002/0147012 A1 | 10/2002 | Leung et al. | |
| 2002/0160815 A1 | 10/2002 | Patel et al. | |
| 2002/0164983 A1 | 11/2002 | Raviv et al. | |
| 2002/0193127 A1 | 12/2002 | Martschitsch | |
| 2003/0054809 A1 | 3/2003 | Bridges et al. | |
| 2003/0129979 A1 | 7/2003 | Cooper | |
| 2003/0158812 A1 | 8/2003 | Engelhart | |
| 2003/0186695 A1 | 10/2003 | Bridges et al. | |
| 2004/0087305 A1 | 5/2004 | Jiang et al. | |
| 2004/0176092 A1 | 9/2004 | Heutschi | |
| 2004/0192306 A1 | 9/2004 | Elkarat et al. | |
| 2004/0203744 A1 | 10/2004 | Hicks et al. | |
| 2004/0203757 A1 | 10/2004 | Nasilski | |
| 2004/0204117 A1 | 10/2004 | Weiner | |
| 2004/0224680 A1 | 11/2004 | Jiang | |
| 2005/0003803 A1 | 1/2005 | Buckley | |
| 2005/0070278 A1 | 3/2005 | Jiang | |
| 2005/0101323 A1 | 5/2005 | De Beer | |
| 2005/0186950 A1 | 8/2005 | Jiang | |
| 2006/0068786 A1 | 3/2006 | Florence | |
| 2007/0054665 A1 | 3/2007 | Elkarat et al. | |
| 2007/0191006 A1* | 8/2007 | Carpenter | 455/435.2 |
| 2007/0281663 A1* | 12/2007 | Sandholm et al. | 455/406 |
| 2008/0020756 A1* | 1/2008 | Jiang | 455/432.1 |
| 2008/0167033 A1* | 7/2008 | Beckers | 455/432.3 |
| 2010/0029290 A1* | 2/2010 | Barbaresi et al. | 455/450 |
| 2010/0185534 A1* | 7/2010 | Satyavolu et al. | 705/30 |
| 2010/0188993 A1* | 7/2010 | Raleigh | 370/252 |
| 2010/0332642 A1* | 12/2010 | Krishnaswamy et al. | 709/224 |

FOREIGN PATENT DOCUMENTS

| | | |
|---|---|---|
| EP | 1463366 | 9/2004 |
| WO | WO 98/23108 | 5/1998 |
| WO | WO 02/080586 | 10/2002 |
| WO | WO 2004/014101 | 2/2004 |
| WO | WO 2004/075484 | 9/2004 |
| WO | WO 2004/075579 | 9/2004 |
| WO | WO 2004/075598 | 9/2004 |
| WO | WO 2005/017693 | 2/2005 |
| WO | WO 2005/018245 | 2/2005 |
| WO | WO 2005/081962 | 9/2005 |
| WO | WO 2005/086927 | 9/2005 |

OTHER PUBLICATIONS

Berec International Mobile Roaming Regulation Report Dec. 2010.*
Communication Pursuant to Article 96(2) EPC Dated Oct. 2, 2006 From the European Patent Office Re.: Application No. 04101190.9.
Communication Pursuant to Article 96(2) EPC Dated Jul. 3, 2007 From the European Patent Office Re.: Application No. 04101190.9.
Communication Pursuant to Article 96(2) EPC Dated Jul. 6, 2006 From the European Patent Office Re.: Application No. 05109638.6.
European Search Report Dated Feb. 6, 2006 From the European Patent Office Re.: Application No. 04101190.9.
Official Action Dated Jan. 2, 2008 From the US Patent and Trademark Office Re.: U.S. Appl. No. 11/580,120.
Official Action Dated Mar. 6, 2007 From the US Patent and Trademark Office Re.: U.S. Appl. No. 11/580,075.
Official Action Dated Aug. 11, 2006 From the US Patent and Trademark Office Re.: U.S. Appl. No. 10/806,281.
Official Action Dated Apr. 12, 2007 From the US Patent and Trademark Office Re.: U.S. Appl. No. 11/250,471.
Official Action Dated Sep. 13, 2007 From the US Patent and Trademark Office Re.: U.S. Appl. No. 11/580,120.
Official Action Dated Oct. 16, 2006 From the US Patent and Trademark Office Re.: U.S. Appl. No. 11/250,471.
Official Action Dated Jul. 18, 2007 From the US Patent and Trademark Office Re.: U.S. Appl. No. 11/580,075.
Official Action Dated Apr. 19, 2007 From the US Patent and Trademark Office Re.: U.S. Appl. No. 11/580,120.
Official Action Dated Sep. 23, 2008 Fom the US Patent and Trademark Office Re.: U.S. Appl. No. 11/580,120.
Official Action Dated May 25, 2006 From the US Patent and Trademark Office Re.: U.S. Appl. No. 10/806,281.
Official Action Dated Sep. 25, 2007 From the US Patent and Trademark Office Re.: U.S. Appl. No. 11/250,471.
Official Action Dated Jan. 2, 2008 From the US Patent Office Re.: U.S. Appl. No. 11/580,120.
Official Action Dated Sep. 13, 2007 From the US Patent Office Re.: U.S. Appl. No. 11/580,120.
Official Action Dated Apr. 19, 2007 From the US Patent Office Re.: U.S. Appl. No. 11/580,120.
Official Action Dated Sep. 29, 2008 From the US Patent Office Re.: U.S. Appl. No. 11/580,120.
ETSI "Universal Mobile Telecommunications System (UMTS). NAS Functions Related to Mobile Station (MS) in Idle Mode ", 3G TS 23.122 Version 3.1.0, 1999.
ETSI—GSM "Digital Cellular Telecommunications System (Phase 2+) (GSM). Universal Mobile Telecommunications System (UMTS). Mobile Radio Interface Layer 3 Specification, Core Network Protocols—Stage 3", 3G TS 24.008 Version 3.2.1, 1999, part I.
ETSI—GSM "Digital Cellular Telecommunications System (Phase 2+) (GSM). Universal Mobile Telecommunications System (UMTS). Mobile Radio Interface Layer 3 Specification, Core Network Protocols—Stage 3", 3G TS 24.008 Version 3.2.1, 1999, part II.
ETSI—GSM "Digital Cellular Telecommunications System (Phase 2+) (GSM). Universal Mobile Telecommunications System (UMTS). Mobile Radio Interface Layer 3 Specification, Core Network Protocols—Stage 3", 3G TS 24.008 Version 3.2.1, 1999, part III.
ETSI—GSM "Digital Cellular Telecommunications System (Phase 2+) (GSM). Universal Mobile Telecommunications System (UMTS). Mobile Radio Interface Layer 3 Specification, Core Network Protocols—Stage 3", 3G TS 24.008 Version 3.2.1, 1999, part IV.
ETSI—GSM "Digital Cellular Telecommunications System (Phase 2+) (GSM). Universal Mobile Telecommunications System (UMTS). Mobile Radio Interface Layer 3 Specification, Corc Network Protocols—Stage 3", 3G TS 24.008 Version 3.2.1, 1999, part V.
ETSI—GSM "Digital Cellular Telecommunications System (Phase 2+) (GSM). Universal Mobile Telecommunications System (UMTS). Mobile Radio Interface Layer 3 Specification, Core Network Protocols—Stage 3", 3G TS 24.008 Version 3.2.1, 1999, part VI.
ETSI—GSM "Digital Cellular Telecommunications System (Phase 2+) (GSM). Universal Mobile Telecommunications System (UMTS). Mobile Radio Interface Layer 3 Specification, Core Network Protocols—Stage 3", 3G TS 24.008 Version 3.2.1, 1999, part VII.
ETSI—GSM "Digital Cellular Telecommunications System (Phase 2+) (GSM). Universal Mobile Telecommunications System (56) References Cited

OTHER PUBLICATIONS (UMTS). Mobile Radio Interface Layer 3 Specification, Core Network Protocols—Stage 3", 3G TS 24.008 Version 3.2.1, 1999, part VIII.
ETSI—GSM "Digital Cellular Telecommunications System (Phase 2+) (GSM). Universal Mobile Telecommunications System (UMTS). Mobile Radio Interface Layer 3 Specification, Core Network Protocols—Stage 3", 3G TS 24.008 Version 3.2.1, 1999, part IX.
ETSI—GSM "Digital Cellular Telecommunications System (Phase 2+) (GSM). Universal Mobile Telecommunications System (UMTS). Mobile Radio Interface Layer 3 Specification, Core Network Protocols—Stage 3", 3G TS 24.008 Version 3.2.1, 1999, part X.
ETSI—GSM "Digital Cellular Telecommunications System (Phase 2+) (GSM). Universal Mobile Telecommunications System (UMTS). Mobile Radio Interface Layer 3 Specification, Core Network Protocols—Stage 3", 3G TS 24.008 Version 3.2.1, 1999, part XI.
ETSI—GSM "Digital Cellular Telecommunications System (Phase 2+) (GSM). Universal Mobile Telecommunications System (UMTS). Mobile Radio Interface Layer 3 Specification, Core Network Protocols—Stage 3", 3G TS 24.008 Version 3.2.1, 1999, part XII.
ETSI—GSM "Digital Cellular Telecommunications System (Phase 2+) (GSM). Universal Mobile Telecommunications System (UMTS). Mobile Radio Interface Layer 3 Specification, Core Network Protocols—Stage 3", 3G TS 24.008 Version 3.2.1, 1999, part XIII.
ETSI—GSM "Digital Cellular Telecommunications System (Phase 2+) (GSM). Universal Mobile Telecommunications System (UMTS). Mobile Radio Interface Layer 3 Specification, Core Network Protocols—Stage 3", 3G TS 24.008 Version 3.2.1, 1999, part XIV.
ETSI—GSM "Digital Cellular Telecommunications System (Phase 2+) (GSM). Universal Mobile Telecommunications System (UMTS). Mobile Radio Interface Layer 3 Specification, Core Network Protocols—Stage 3", 3G TS 24.008 Version 3.2.1, 1999. part XV.

* cited by examiner

SYSTEM AND METHOD FOR STEERING OF ROAMING

RELATED APPLICATION

This application claims the benefit of priority under 35 USC §119(e) of U.S. Provisional Patent Application No. 61/609,464 filed Mar. 12, 2012, the contents of which are incorporated herein by reference in their entirety.

FIELD AND BACKGROUND OF THE INVENTION

The present invention, in some embodiments thereof, relates to a system and method for a home network to steer its roaming users to preferred partner mobile operators at a roaming location.

Nowadays, Steering of Roaming (SoR) technology is commonly used by the great majority of mobile operators around the world. SoR technology allows mobile operators to control or steer their mobile users to register with particular mobile networks when roaming outside their home network. Given these capabilities, operators have the basic means to start negotiating for better prices, as they can now steer users to the network that offers them the best prices, or alternatively, they could promise to steer users in the future in return for a better deal, although in practice this is rarely done.

SoR allows operators to formulate Roaming Discount Agreements, or simply Discount Agreements, between them, instead of using flat charges. Quite a number of forms of Discount Agreements have been formulated, and are typically built of several tiers, in which each price tier is priced differently, and typically assigned to a certain traffic volume. This allows operators to reduce the price only if their partner creates a large enough traffic volume, or more generally to relate unit charges to overall usage.

Due to relatively complex Discount Agreements, it is difficult to find the optimal steering of the mobile registrations that may result in the lowest cost to the home operator. Today, operators typically steer their users by manually setting steering goals such as percentages of users in each network. In more advanced systems such as the Starhome IPN, operators are able to aim at an accurate amount of traffic sent to each operator, or even reach a certain cost based on flat fees. But the effect of different unit costs depending on overall usage or the effects of Discount Agreements remain outside the equation.

SUMMARY OF THE INVENTION

The present embodiments may provide a system whose purpose is to automatically optimize Steering of Roaming, taking into account Roaming Discount Agreements between mobile network roaming partners.

The system may take into account all the different Roaming Discount Agreements between the home network and the various partners in a certain country, as well as historic usage data, and outputs steering instructions with the aim of minimizing the overall cost to the home operator.

According to an aspect of some embodiments of the present invention there is provided apparatus for optimization of steering of roaming users to preferred operators at a roaming network, the apparatus comprising: a first input for receiving data of past roaming usage;

a second input for receiving cost data of respective roaming network operators for future usage, the cost data comprising a relationship of cost to utilized volume, the relationship being specific for each operator;

a steering optimization unit connected to the first input and to the second input and configured to estimate future usage from the past roaming usage and to assign the estimated roaming usage between the respective roaming operators so as to generate respective quotas for the roaming operators, the quotas selected to minimize an overall usage cost for the estimated usage, the quotas forming a steering plan; and an output for providing the steering plan to a steering of roaming unit to enable the steering of roaming unit to use the steering plan to allocate identified roaming users among the respective roaming operators according to the plan.

In an embodiment, the steering optimization unit is configured to carry out the estimating of the future usage from the past usage by applying a gain function to the past usage.

In an embodiment, the steering optimization unit is configured to carry out the estimating of the future usage from the past usage by applying a seasonal variation function to the past usage.

In an embodiment, the roaming network operator usage cost data involves a step function, one for each operator, and the different step functions each have one or more step discontinuities. The quotas are selected by iteratively applying usage to respective operators up to different combinations of the step discontinuities and selecting a combination giving a lowest cost.

In an embodiment, the network operator usage cost data is provided for a first feature, say mobile originated calling, and one or more additional features, and the usage of the different features is related by respective proportional constants. The apparatus may then use the proportional constants to normalize the additional features to the first feature to allow for a single calculation that optimizes for all features.

In an embodiment, the additional features are one or more of mobile terminated calling (MTC), short messaging service (SMS), general packet radio service (GPRS), third generation data services and fourth generation data services.

An embodiment may repeat the iterations for variations of the predicted future usage, to determine whether the lowest cost allocation is resilient to changes in usage levels or is sensitive to changes in usage levels.

An embodiment may request user intervention in the case of sensitivity to usage levels.

In an embodiment, cost data is for respective operator predetermined time periods, the steering optimization unit being configured to carry out the allocation separately for units of time in which the cost data remains constant over all of the respective providers.

According to a second aspect of the present invention there is provided a method for steering of roaming users to preferred operators at a roaming network, the method comprising:

receiving data of past roaming usage;

receiving cost data of respective roaming network operators for future usage, the cost data comprising a relationship of cost to utilized volume, the relationship being specific for each operator;

estimating future usage from the past roaming usage and assigning the estimated roaming usage between the respective roaming operators so as to generate respective quotas for the roaming operators, the quotas selected to minimize an overall usage cost for the estimated usage;

forming a steering plan from the quotas; and outputting the steering plan to a steering of roaming unit to enable to the unit to allocate identified roaming users among the respective roaming operators according to the plan.

According to a third aspect of the present invention there is provided apparatus for steering of roaming users to preferred operators at a roaming network comprising:

a steering optimization unit configured to use operator agreements with mobile operators, as well as usage predictions based on historical usage patterns, to calculate an optimized steering plan that minimizes roaming charges, the operator agreements being step functions, the unit constructing the plan by iterating through different allocations of the usage prediction between the various mobile operators and selecting an optimal allocation for the plan;

and a steering of roaming unit, connected to the steering optimization unit to receive the optimized steering, the steering of roaming unit configured to identify registration attempts by actual roaming users and to steer the registration attempts to fulfill respective quotas in the plan.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a system and method for a home network to steer its roaming users to preferred partner mobile operators at a roaming location.

The present embodiments provide a system in which past usage history as well as different usage costs or usage patterns, can be used to steer roamers in such a way as to minimize overall costs.

More particularly, apparatus for steering of roaming users to preferred operators at a roaming network uses operator agreements with mobile operators, as well as usage predictions and historical usage patterns, to calculate an optimized steering plan that minimizes the charges to the home operator. The operator agreements are typically step-like in nature and the plan is constructed by iterating through different allocations of the estimated usage between the various mobile operators. The iterations may include various roaming services such as SMS and data as well as mobile originated and mobile terminated calls. The allocation finally selected as the optimal plan is then passed to a steering of roaming unit which identifies registration attempts by actual roaming users and steers said registration attempts to fulfill the usage quotas in the plan.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
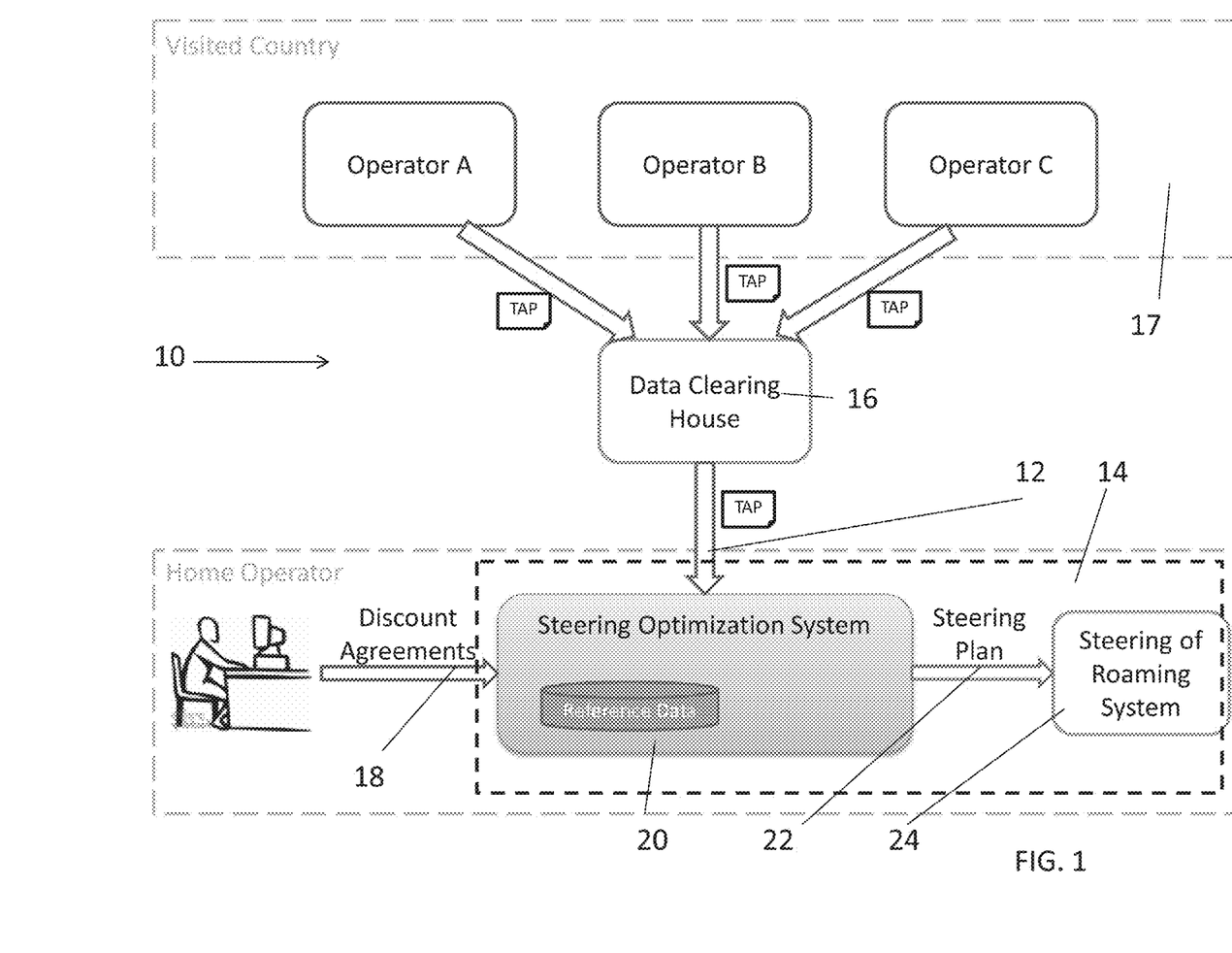
FIG. 1 is a simplified block diagram illustrating a steering of roaming system that uses past usage data together with operator cost data to provide optimal steering according to an embodiment of the present invention.

Referring now to the drawings, FIG. 1 is a schematic diagram illustrating a generalized embodiment of a system that uses an apparatus for steering of roaming users to preferred operators at a roaming network. The system 10 includes a first input 12 to apparatus 14. The input receives data of past roaming usage, such as TAP historical usage data from the individual operators A, B and C, via data clearing house 16.

A second input 18 obtains cost data from the different roaming network operators for future usage. The cost data may be in the form of a discount agreement and may define a particular relationship of cost to utilized volume. The agreements are typically specific to the individual operator of the roaming network.

A steering optimization unit 20 obtains the historical usage data and the cost data, and firstly estimates future usage based on the past roaming usage data. The estimate may be a simple one-to-one extrapolation, or may assume a certain percentage of growth, or may adjust for expected unusual events or some combination of the above. The estimated roaming usage is then assigned between the different roaming operators in that each operator is giving a usage quota, typically in percentage terms, where the quotas are selected to minimize the overall usage cost for the estimated usage. The set of overall quotas constitutes a steering plan 22. For example, the steering plan for a specific country can be to divide the roamers such that 70% are steered to roaming network A, 20% to network B and 10% to network C. Another example could be a usage-based steering plan. That is, to allocate all heavy users of data to roaming network A, and all silent roamers, that is users who show very little activity to network B. The roamers can be divided into clusters, based on their usage history, and the steering plan may be associated with these clusters. A steering of roaming unit 24 operates in real time to identify registration attempts by actual roaming users and steer the registration attempts to fulfill the defined usage quotas, and thus fulfill the steering plan.

The steering optimization unit may estimate the future usage from the past usage by applying a gain function. For example it may be assumed that network usage grows by X % per year, so that the usage for next period should be assumed to be X % more than the usage for the identical period of the previous year. In general, roaming usage has a seasonal aspect to it. Tourism is a major source of roaming usage and has a distinct seasonal pattern. Business usage has less of a seasonal pattern, but there still is a seasonal pattern even there. Thus use of historical data should compare identical periods of different years, or a seasonal variation function should be applied to compensate for seasonal variations. In addition, special events of an international character such as trade fairs or major sporting events may be inserted as additional factors temporarily affecting roaming usage.

The roaming network operator usage cost data is most generally a step function which is different for each operator. An example is given in FIG. 2 which is discussed in greater detail below. The step functions are generally continuous but each have step discontinuities. The quotas may be selected by iteratively applying usage to the functions of the different operators for different combinations of the step discontinuities and selecting a combination giving a lowest cost, as discussed in greater detail below. An example is shown in FIG. 3 which is discussed in greater detail below.

The step functions may be provided for several different roaming features, such as mobile originated calls, mobile terminated calls, SMS messaging and different data communication protocols. In one embodiment the different features are dealt with by normalizing the different features using usage ratios or proportions. Thus if two SMS messages are sent on average for every phone call, then that proportion of two to one is used to normalize the SMS usage and use it in the same calculation, as will be discussed in greater detail below.

Iterations may be repeated for different overall usage level. For example the future usage predictions may be varied, say by ten percent each way. The lowest cost allocation may or may not be affected and can be categorized as usage resilient/stable or usage sensitive. In the case of being usage sensitive the quotas may need to be changed when it becomes apparent that actual usage is wandering significantly from the prediction. The system may be able to modify the quotas based on a recalculation or may request user intervention.

Figure 4:
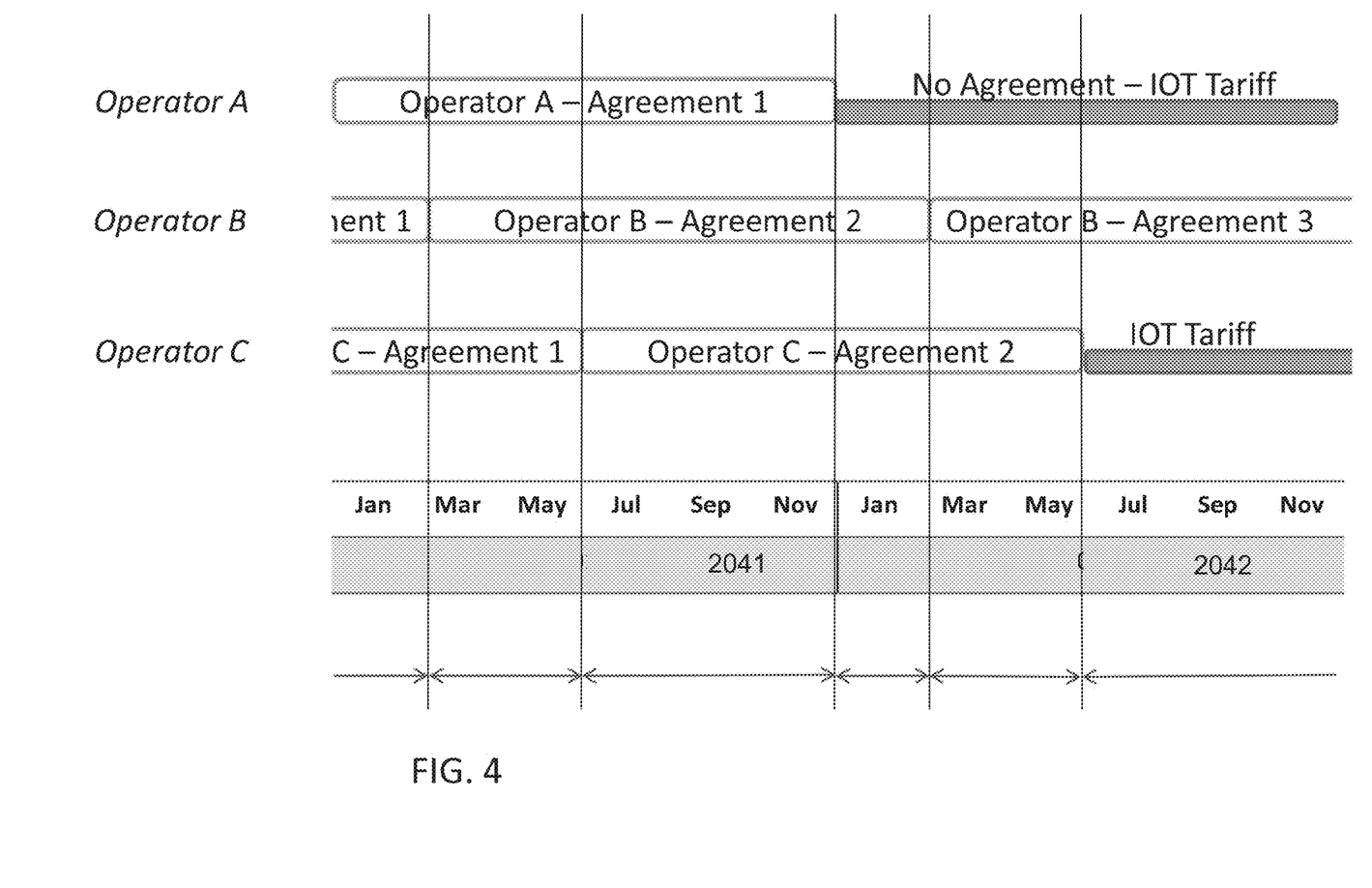
FIG. 4 is a simplified schematic diagram showing the time chart of FIG. 2 divided up into periods with constant functions for independent calculation.

As will be discussed in detail below, the agreements may be for specific time periods, as shown in FIG. 4, so that the assignment of quotas would be for the time period that the same set of agreements are in force over all the operators. If just one of the operator agreements change at a given time then a new calculation period may be needed.

Figure 5:
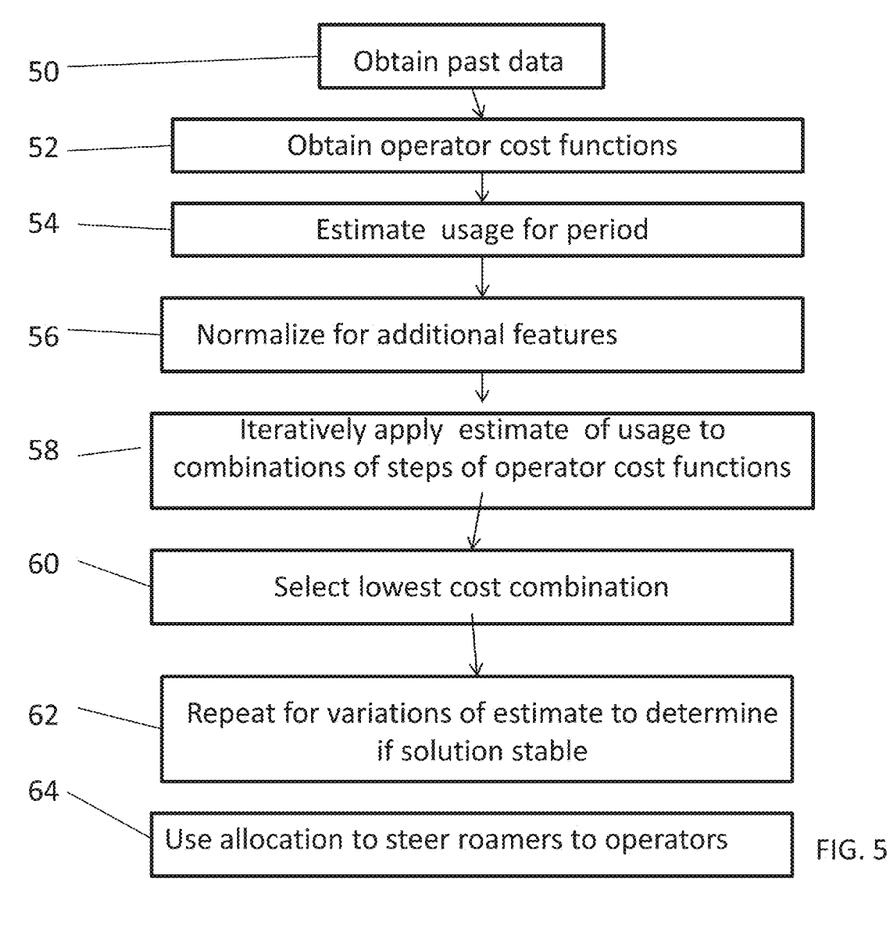
FIG. 5 is a simplified flow chart illustrating a possible operation of the embodiment of FIG. 1.

Reference is now made to FIG. 5, which is a simplified flow chart illustrating a method for steering of roaming users to preferred operators at a roaming network.

The method first obtains data of past roaming usage—box 50.

The method then obtains cost data of the different roaming network operators for usage over the time period in question—box 52. The cost data includes a relationship of cost to utilized volume, which is specific for each operator.

In box 54 the method estimates future usage from the past roaming usage and other relevant data that may be to hand. Box 56 indicates that usage allocated to different features is normalized with a main feature such as mobile originated calling, as will be discussed in greater detail below. Box 58 indicates an iterative process of assigning estimated roaming usage between the different roaming operators so as to generate respective usage quotas for each roaming operator. The lowest cost combination is typically selected in box 60. In box 62 the quota allocation is tested against perturbations in the future usage estimate to decide how stable the quota solution is to actual usage which is different from the prediction.

The lowest cost combination forms the steering plan, which can now be sent to a steering unit. Box 64 indicates that a steering unit may use the steering plan and identify registration attempts by actual roaming users. The steering unit may then steer the registration attempts between the operators to fulfill the usage quotas.

System Description

The following describes the Steering Optimization System in greater detail by presenting its required interfaces, the complexity and variety of Discount Agreements, and a first exemplary algorithmic approach for generating an optimal steering plan.

System Interfaces

As discussed above, FIG. 1 is a schematic block diagram showing the overall Steering Optimization System and its interfaces.

As explained above, the Steering Optimization unit 20 is geared to producing a Steering Plan which is transferred to the SoR system for optimized steering. In order to achieve that, the Steering Optimization System may use some or all of the following information:

1. Reference Data, such as the list of operators in each country, their TADIG codes and more.
2. A list detailing Roaming Discount Agreements for all operators with which a roaming discount agreement exists or is about to be signed. The Discount Agreements are comprised of various discount models, typically with a tiered pricing approach, separated between different services (mobile originated call MOC, mobile terminated call MTC, short messaging service SMS & Data). Many Discount Agreement models can be used as described later in this document, and different operators may use different models.
3. A continuous flow of TAP files from all operators with which the home operator has roaming agreements. TAP files are typically received from a data clearing house, and contain all transactions carried out by roamers at the visited network.

Given the above inputs and an algorithm the same as or similar to the algorithms described herein, the Steering Optimization unit 20 may calculate and generate an optimal Steering Plan at any given point in time, which aims to minimize the cost for the HPLMN.

Roaming Discount Agreements

The key to producing an optimal steering plan is to take into account the complexity of Roaming Discount Agreements.

Discount Agreements are signed between the home operator (HPLMN) and his roaming partners (the VPLMNs). Per country, the home operator will typically sign Discount Agreements with a few of the operators in that country. Discount Agreements are typically signed for 1 year (although it can be longer or shorter). Since not all agreements are signed together, the agreement timeline may be as shown in FIG. 2.

Figure 2:
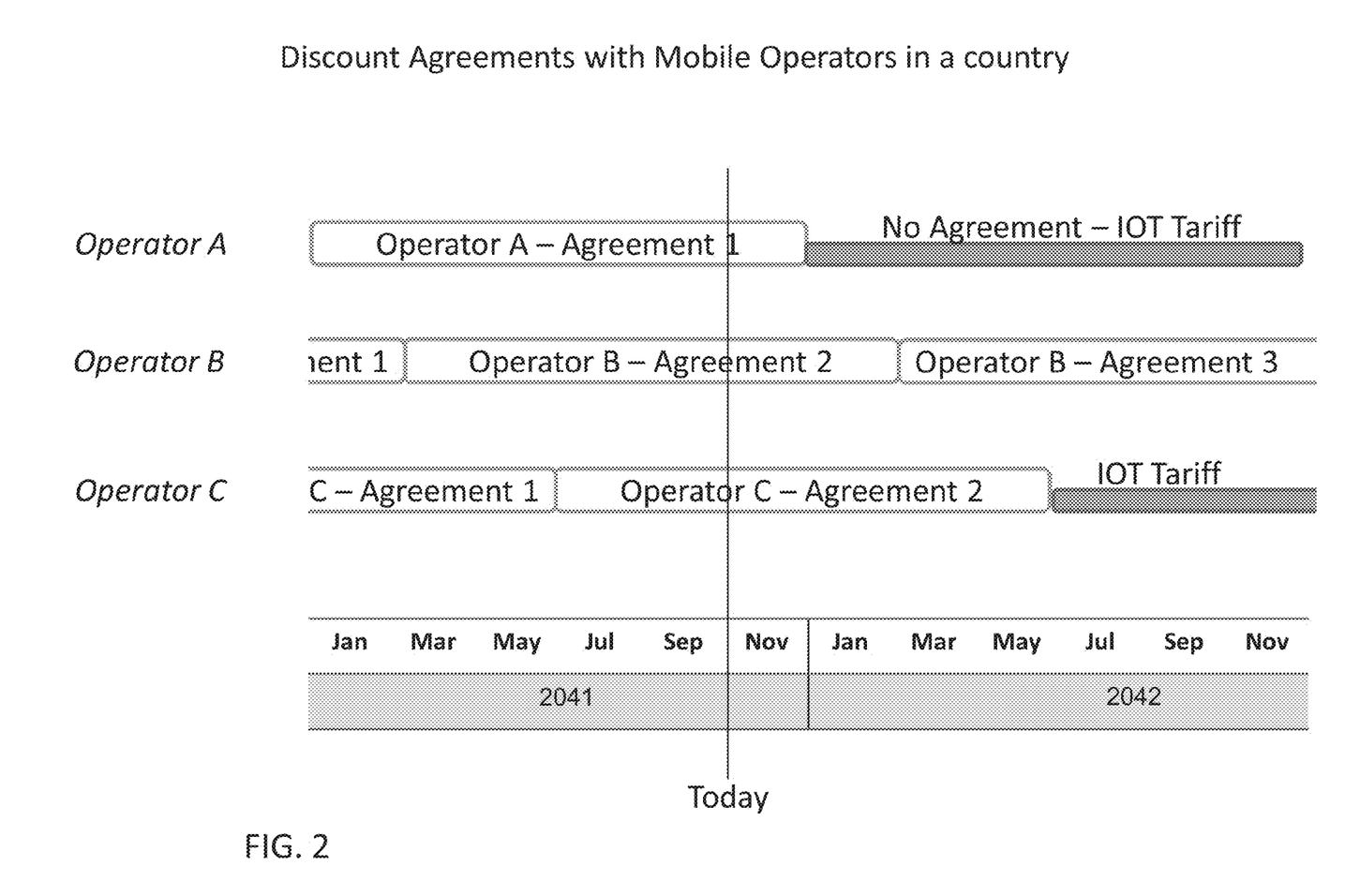
FIG. 2 is a simplified block diagram illustrating a time chart of three cost functions for three different operators.
Figure 3:
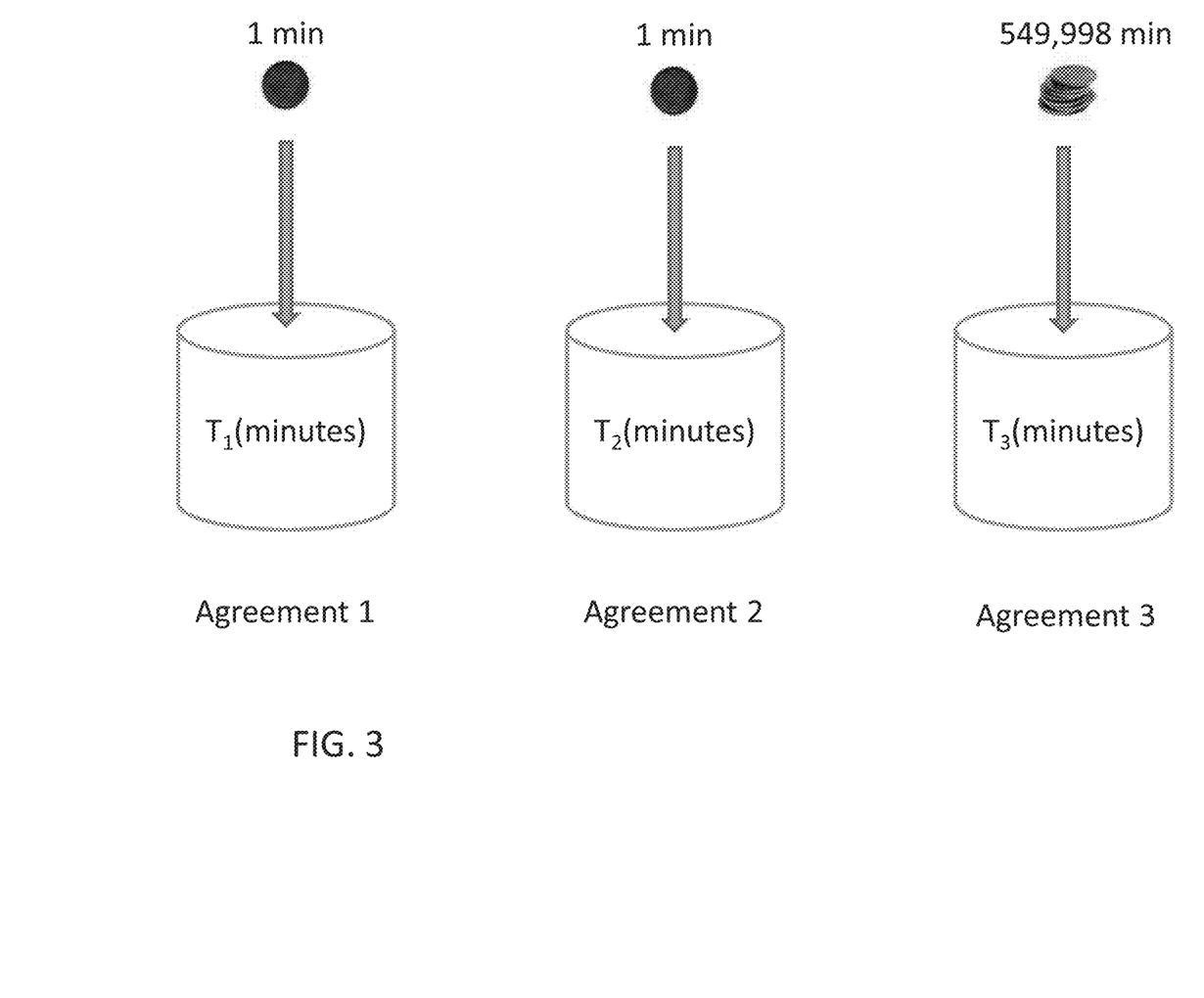
FIG. 3 is a simplified schematic diagram showing usage minutes being allocated to different operators in accordance with an embodiment of the present invention.

As illustrated in FIG. 2, the home operator may have Discount Agreements signed with a few of the operators in a specific country, each starting and ending at different periods of time.

Now, diving into the structure of a single Discount Agreement, it may typically include separate sections for the different services—MOC, MTC, SMS and Data. Each section may typically be built from different price tiers, as shown in Table 1 below:

Outbound MOC Section Example

TABLE 1

Typical Price Tiers for different levels of usage

| Tariff Tier | Traffic | Tariff |
| --- | --- | --- |
| 1 | 0-500,000 | €0.4/min |
| 2 | 500,000-750,000 | €0.35/min |
| 3 | 750,000 and above | €0.30/min |

Many Discount Agreement models may be used between mobile operators. Some of them are listed below:

Flat Rate—the simplest model, where a simple flat rate is agreed upon.

Regular—this model is used when traffic is provided in real MOC/MTC minutes, SMS numbers and Mbytes of data.

Baseline+percentages—this model is used when traffic is first stated as "baseline" for the first tariff tier, and next tariff tiers are set as X percent on top of the baseline.

Balanced/unbalanced—this model is used when there are no absolute traffic figures set; instead, operators pay each other only when one of them exceeds the traffic of the other, and therefore only "unbalanced" traffic tiers can be set.

In each model, different tariff tiers may be used. Some are listed below:

Regular tariff—tariff is entered per measured unit (minutes for MOC/MTC, units for SMS and MB for data).

Retroactive tariff—if such a tier is reached, the tariff in this tier applies retroactively from the first tier.

Send of Pay tariff—used when there is a commitment for a fixed payment regardless of whether the traffic has been consumed or not.

To summarize, Discount Agreements may appear in many forms and shapes, which makes it difficult to find the best steering plan to take advantage of all agreement details in order to reach the minimal cost.

Finding an Improved Steering Plan

The following describes, in a schematic and high level manner, a possible way to calculate the optimal steering distribution in order to reach a minimized, or ideally a minimal, cost. This is just an example, and alternative algorithms would suggest themselves to the skilled person. Its purpose is to show the feasibility of having a simple algorithm which can, in a short number of iterations, reach an optimal cost among agreements.

Prerequisites

In order to generate an optimal steering plan, to approach a lowest cost, the following inputs are required:

The list of Discount Agreements with all the operators in the country where the optimization is required.

Historic usage data.

For now we assume that the system has performed a prediction of future usage based on historic usage data. The prediction process is discussed hereinbelow.

Optimal Steering

MOC Only

Having a prediction of future usage, and taking into consideration the Discount Agreements, an algorithm may be applied which can find an optimal plan.

For simplicity in constructing the following example, we assume the following:

We have 3 Discount Agreements, starting and ending at the same time, each for a period of 1 year;

All agreements cover only MOC-mobile originated calls;

For each agreement, we have a function $T_n$(minutes) which, given the amount of minutes, returns the total charge of the agreement. Such a function is very easy to implement given the discount model and tiers as described hereinabove;

The usage prediction indicates that during the next year the total outbound traffic in the country would be 550,000 minutes.

In such a case, in order to reach the lowest cost, we may treat each agreement as a bucket, and fill each bucket with a certain amount of minutes, such that the total minutes sums up to 550,000. Let's assume we start by giving the first agreement 1 minute, the second agreement 1 minute, and the rest to the $3^{rd}$ agreement. The distribution is illustrated schematically in FIG. 3, which shows the allocation of minutes to each of three agreements.

In the example of FIG. 3 we distribute 550,000 minutes as 1+1+549,998 minutes between the 3 Discount Agreements. The total cost for this distribution may be calculated as follows:

Total Cost=$T_1(1)+T_2(1)+T_3(549,998)$

Now we can continue by changing the distribution—give 2 minutes to Agreement1, 1 minute to Agreement2, 549,997 minutes to Agreement3 and recalculate the cost, as follows:

Total Cost=$T_1(2)+T_2(1)+T_3(549,997)$

The above method will eventually produce a result, but is extremely inefficient, with the number of iterations going up extremely fast as the number of agreements and number of minutes grow.

A possible solution to the above would be to understand the nature of Discount Agreements. The charge of a Discount Agreement for a given usage is a linear function, and as such, the minimal cost will be found at the boundaries of tariff tiers. Therefore, by checking the cost of each agreement just around the edges of a tariff tier we can find the minimal cost much faster. For example, if $T_1$ (minutes) has one tier set at 100,000 minutes, there is no point iterating by giving it 1 minute, 2 minutes etc.; instead, we could check around the tier points. Therefore the interesting check points will be zero minutes, 100,000 minutes, 100,001 minutes, and the total minutes. Using this method, possible iterations may look like this:

$$Cost_1 = T_1(0) + T_2(0) + T_3(550,000)$$

$$Cost_2 = T_1(100,000) + T_2(0) + T_3(450,000)$$

$$Cost_3 = T_1(100,001) + T_2(0) + T_3(449,999)$$

$$Cost_4 = T_1(550,000) + T_2(0) + T_3(0)$$

and so on. Of course, for each iteration step of $T_1$, we may also iterate the same way over the other discount agreements.

Adding Other Services to the Equation

A second level of complexity can be introduced by considering other services such as SMS and Data, which typically have their own traffic tiers. A possible way to handle these is to normalize them to MOC tiers. For example, if we know, based on historic data, that for every MOC call, 2 SMS messages are sent on average, i.e. the ratio is 1:2 between MOC and SMS, we can normalize the SMS tiers into MOC tiers. For example, let's assume that the first SMS tariff tier is set to 50,000 SMS messages. Since we have a ratio of 1:2 between MOC and SMS, it means that after 25,000 MOC minutes, 50,000 SMSs will be sent. Therefore, our algorithm should iterate also over the 25,000 minute point, as this would in fact be the SMS switch point between tiers. One may enhance the model described hereinabove, and assume now that each Discount Agreement's cost is represented by a function of the form $T_n$(minutes, sms), and then iterate over the agreements as follows, remembering that for every MOC minute we have 2 SMS messages in addition):

$$Cost_1 = T_1(0,0) + T_2(0,0) + T_3(550000,1100000)$$

$$Cost_2 = T_1(25000,50000) + T_2(0,0) + T_3(525000, 1050000)$$

$$Cost_3 = T_1(25001,50002) + T_2(0,0) + T_3(524999, 1049998)$$

and so on.

Handling Non-Overlapping Agreements

As described hereinabove, Discount Agreements may not always overlap in time. An agreement with Operator A, for example, may be from January till January of the following year, while an agreement with Operator B may be from March till March of the following year. This introduces another level of complexity. In order to handle this, a possible solution is to divide the handled period of time into sub-periods, where each sub-period has only one agreement per operator. The time line of FIG. 2 is modified as shown in FIG. 4, and the arrows at the base of the time line illustrate the separate periods in which a constant agreement background is maintained.

Now, after dividing the whole period into sub-periods, one can perform the iteration over the agreements separately in each sub-period (after having predicted the usage per sub-period), and then sum them all up to reach the overall cost for the iteration.

Usage Prediction and Sensitivity Calculation Usage Prediction

As mentioned hereinabove, the algorithms used to find the optimal steering plan depend on the prediction of usage in the required future period. In order to predict future usage based on historic data, many algorithms can be applied. For example, the simplest algorithm would probably be to assume that the usage pattern stays the same across the historic period and the future period. Another algorithm may assume a certain growth, certain trends such as the increased usage of mobile data, and perhaps even allow for manual configuration of special events such as the Olympic games being held in a certain country etc.

In any case, one may consider the following factors when predicting future usage:

Seasonality—mobile usage is obviously affected by seasonality and therefore should be taken into account.

Usage patterns of the various services—data usage, for example, may behave differently than voice usage during a certain season, as different parts of the population travels abroad in different seasons.

Destination country—obviously each destination country has its own usage patterns which need to be taken into account.

Sensitivity to Usage Prediction

Another factor in generating an optimal steering plan is to check the sensitivity of the plan to different usage patterns. As described above, an algorithm should be applied in order to predict usage in the required future period. However, as this is just a prediction, the actual traffic will always be different from the prediction. Therefore it is relevant to generate optimal steering plans while assuming different usage predictions, from, for example, −10% to +10% of the prediction.

Performing the above sensitivity check can basically yield two results. One would be that the steering plan stays the same for different usage predictions (e.g. steer all the way to Operator A). In this case, the plan is not sensitive to the accuracy of the prediction. Another possible result would be that, assuming different usage predictions, the optimal steering plan changes (e.g. if the prediction is 550,000 minutes steer all the way to Operator A, but if the prediction is 580,000 minutes then steer all the way to Operator B). In this case the plan should be flagged as sensitive to the usage prediction. In this case a human person may be made aware of the sensitivity analysis, and asked to instruct the system for the preferred action.

Inbound Traffic Factor

Another important factor in generating an optimal steering plan is to take into account the relations with the relevant operators in terms of inbound traffic. If my system steers outbound subscribers between operators A, B and C, the potential impact of steering made by operators A, B, C towards my network may also be considered. The roaming agreement may include terms related to inbound traffic. Such terms may be considered in a similar manner to the outbound terms.

Another relevant factor in generating an optimal steering plan is the relations between the operators and groups of operators. If Operator A, for example, belongs to a group, then the agreements with all group members may be taken into account, for both outbound and inbound roaming (again, in a similar manner).

Summary

The above describes a system whose purpose is to automatically optimize Steering of Roaming by taking into account Roaming Discount Agreements between mobile network roaming partners in order to minimize costs.

It is expected that during the life of a patent maturing from this application many relevant steering of Roaming systems will be developed and the scope of the term "steering of roaming" is intended to include all such new technologies a priori.

The terms "comprises", "comprising", "includes", "including", "having" and their conjugates mean "including but not limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Apparatus for optimization of steering of roaming users to preferred operators at a roaming network, the apparatus comprising:
    a first input for receiving aggregated data of past roaming usage, said data as received being aggregated over multiple users;
    a second input for receiving cost data of respective roaming network operators for future usage, said cost data comprising a relationship of cost to utilized volume of multiple users, said relationship being specific for each operator;
    a steering optimization unit connected to said first input and to said second input and configured to estimate future roaming usage from said past roaming usage and to assign said estimated future roaming usage of said multiple users between said respective roaming operators so as to generate respective quotas for said roaming operators, said quotas being selected on the basis of said aggregated data and respective operator agreements to minimize an overall usage cost for said estimated future roaming usage, said quotas forming a steering plan; and
    an output configured to provide said steering plan to a steering of roaming unit to enable said steering of roaming unit to use said steering plan to allocate identified roaming users among said respective roaming operators according to said plan and said quotas.

2. The apparatus of claim 1, wherein said steering optimization unit is configured to carry out said estimating of said future usage from said past usage by applying a gain function to said past usage.

3. The apparatus of claim 1, wherein said steering optimization unit is configured to carry out said estimating of said future usage from said past usage by applying a seasonal variation function to said past usage.

4. The apparatus of claim 1, wherein roaming network operator usage cost data comprises a step function for each operator, respective step functions each having a plurality of step discontinuities and said quotas being selected by iteratively applying usage to respective operators up to different combinations of said step discontinuities and selecting a combination giving a lowest cost.

5. The apparatus of claim 4, wherein said network operator usage cost data is provided for a first feature and one or more additional features, usage of said features being related by respective proportional constants, the apparatus configured to use said proportional constants to normalize said additional features to said first feature.

6. The apparatus of claim 5, wherein said first feature is mobile originated calling (MOC) and said additional features comprise at least one member of the group consisting of mobile terminated calling (MTC), short messaging service (SMS), general packet radio service (GPRS), third generation data services and fourth generation data services.

7. The apparatus of claim 4, further configured to repeat said iterations for variations of said estimated future roaming usage, to determine whether said combination giving a lowest cost is resilient to changes in usage levels or is sensitive to changes in usage levels.

8. The apparatus of claim 7, configured to request user intervention in said case of sensitivity to usage levels.

9. The apparatus of claim 1, wherein said cost data is for respective operator predetermined time periods, said steering optimization unit being configured to carry out said allocation separately for units of time in which said cost data remains constant over all of said respective operators.

10. Method for steering of roaming users to preferred operators at a roaming network, the method comprising:
    receiving data of past roaming usage, said received data being data that is aggregated over said roaming users;
    receiving cost data of respective roaming network operators for future usage, said cost data comprising a relationship of cost to utilized volume of an aggregation of users, said relationship being specific for each operator;
    estimating future roaming usage aggregated over said roaming users from said past roaming usage and assigning said estimated future roaming usage between said respective roaming operators using said aggregated data and respective roaming agreements so as to generate respective quotas for said roaming operators, said quotas selected to minimize an overall usage cost for said estimated future roaming usage;
    forming a steering plan from said quotas; and
    outputting said steering plan to a steering of roaming unit to enable said unit to allocate identified roaming users among said respective roaming operators according to said plan and said quotas.

11. The method of claim 10, comprising carrying out said estimating of said future usage from said past usage by applying a gain function to said past usage.

12. The method of claim 10, comprising carrying out said estimating of said future usage from said past usage by applying a seasonal variation function to said past usage.

13. The method of claim 10, wherein roaming network operator usage cost data comprises a step function for each operator, respective step functions each having a plurality of step discontinuities, the method comprising selecting said quotas by iteratively applying usage to respective operators up to different combinations of said step discontinuities and finding a combination giving a lowest cost.

14. The method of claim 13, wherein said network operator usage cost data is provided for a first feature and one or more additional features, usage of said features being related by respective proportional constants, the method comprising:
   using said proportional constants to normalize said additional features to said first feature; and
   using normalized usage of said additional features together with usage of said first feature in said iteratively applying usage.

15. The method of claim 14, wherein said first feature is mobile originated calling and said additional features comprise at least one member of the group consisting of mobile terminated calls (MTC), short messaging service (SMS), general packet radio service (GPRS), third generation data services and fourth generation data services.

16. The method of claim 13, comprising repeating said iterations for variations of said estimated future roaming usage, to determine whether said combination giving a lowest cost is resilient to changes in usage levels or is sensitive to changes in usage levels.

17. The method of claim 16, comprising requesting user intervention in said case of sensitivity to usage levels.

18. The method of claim 10, wherein said cost data is for respective operator predetermined time periods, said method comprising carrying out said allocation separately for units of time in which said cost data remains constant over all of said respective operators.

19. Apparatus for steering of roaming users to preferred operators at a roaming network comprising:
   a steering optimization unit configured to use operator agreements with mobile operators, as well as usage predictions based on historical usage patterns of aggregated roaming users, to calculate an optimized steering plan for said aggregated roaming users that minimizes roaming charges, the operator agreements being step functions of user volume, the unit constructing the plan by iterating through different allocations of the usage prediction between the various mobile operators and selecting an optimal allocation for said plan, said optimal allocation providing quotas for respective ones of said operators;
   and a steering of roaming unit, connected to the steering optimization unit to receive said optimized steering, the steering of roaming unit configured to identify registration attempts by actual roaming users and to steer said registration attempts to fulfill respective quotas in the plan according to respective provider step functions.

\* \* \* \* \*